United States Patent [19]
Dutt

[11] Patent Number: 5,035,480
[45] Date of Patent: Jul. 30, 1991

[54] STAR-COUPLERS WITH BICONICAL MIXING ELEMENTS AND METHODS FOR MAKING THE SAME

[75] Inventor: Bulusu V. Dutt, Yorktown Heights, N.Y.

[73] Assignee: Codenoll Technology Corporation, Yonkers, N.Y.

[21] Appl. No.: 403,551

[22] Filed: Sep. 6, 1989

[51] Int. Cl.$^5$ ............................................... G02B 6/26
[52] U.S. Cl. ............................. 350/96.15; 350/96.16
[58] Field of Search ........................... 350/96.15, 96.16

[56] References Cited

U.S. PATENT DOCUMENTS

| | | | |
|---|---|---|---|
| 3,227,535 | 1/1966 | Woodcock | 65/4 |
| 4,008,061 | 2/1977 | Ramsay | 65/4 A |
| 4,054,366 | 10/1977 | Barnoski et al. | 350/96 C |
| 4,083,625 | 4/1978 | Hudson | 350/96.15 |
| 4,200,356 | 4/1980 | Hawkes et al. | 350/96.16 |
| 4,291,940 | 9/1981 | Kawasaki et al. | 350/96.15 |
| 4,362,357 | 12/1982 | Stockmann et al. | 350/96.16 |
| 4,367,013 | 1/1983 | Guerder et al. | 350/96.34 |
| 4,392,712 | 7/1983 | Ozeki | 350/96.16 |
| 4,449,783 | 5/1984 | Witte | 350/96.16 |
| 4,484,794 | 11/1984 | Witte | 350/96.16 |
| 4,550,974 | 11/1985 | Murphy | 350/96.15 |
| 4,560,247 | 12/1985 | Aldebert | 350/96.30 |
| 4,566,753 | 1/1986 | Mannschke | 350/96.16 |
| 4,590,619 | 5/1986 | Winzer | 455/612 |
| 4,653,845 | 3/1987 | Tremblay et al. | 350/96.16 |
| 4,687,284 | 8/1987 | Rawson et al. | 350/96.16 |
| 4,708,424 | 11/1987 | Marhic | 350/96.16 |
| 4,822,128 | 4/1989 | Imoto et al. | 350/96.16 |
| 4,869,570 | 9/1989 | Yokohama et al. | 350/96.15 |

FOREIGN PATENT DOCUMENTS

| | | |
|---|---|---|
| 0174014 | 12/1986 | European Pat. Off. . |
| 0219096 | 4/1987 | European Pat. Off. . |
| 57-197512 | 12/1982 | Japan . |
| 62-061012 | 3/1987 | Japan . |

OTHER PUBLICATIONS

Barnoski et al., "Fabrication of an Access Coupler with Single-Strand Multimode Fiber Waveguides", *Applied Optics*, vol. 15, No. 11, Nov. 1976, pp. 2629-2630.

Casasent et al., "Adaptive Photodichroic Matched Spatial Filter", *Applied Optics*, vol. 15, No. 11, Nov. 1976, p. 2631.

Ozeki et al., "Tapered Section of Multimode Cladded Fibers as Mode Filters and Mode Analyzers", *Appl. Phys. Ltrs.*, vol. 26, No. 7, Apr. 1, 1975, pp. 386-388.

Ozeki et al., "Optical Directional Coupler Using Tapered Sections in Multimode Fibers", *Appl. Phys. Ltrs.*, vol. 28, No. 9, May 1, 1976, pp. 528-529.

Yamamoto et al., "A Large-Tolerant Single-Mode Optical Fiber Coupler with a Tapered Structure", *Proc. of IEEE*, Jun. 1976, pp. 1013-1014.

*Primary Examiner*—John D. Lee
*Attorney, Agent, or Firm*—Pennie & Edmonds

[57] ABSTRACT

A fiber optic star-coupler with a biconical mixing element and method for inexpensively manufacturing the same are disclosed. The fiber optic star-coupler includes an input fiber optic bundle, an output fiber optic bundle and a biconical mixing element. Each of the bundles comprises a plurality of individual optical fibers. The biconical mixing element includes tapered regions and a central mixing zone to promote uniform mixing and equal distribution of optical energy among all of the optical fibers in the output fiber optic bundle. The biconical mixing element is provided with connectors at each of its two ends for coupling to other connectors, adaptors, and fiber optic bundles. Alternatively, the biconical mixing element may be formed by injection molding techniques. The optical fibers may be constructed from plastic or silica.

7 Claims, 4 Drawing Sheets

STAR-COUPLERS WITH BICONICAL MIXING ELEMENTS AND METHODS FOR MAKING THE SAME

CROSS-REFERENCE TO RELATED APPLICATIONS

Related applications are application Ser. No. 7/281,114, filed Dec. 7, 1988 entitled "Optical Star-Couplers and Methods for Making Sam " application Ser. No. 7/297,009, filed Jan. 12, 1989 (abandoned) "Injection Molded Star-Couplers and Methods of Making Same" and application Ser. No. 07/560,264, filed July 27, 1990 entitled "Method of Injection Molding Star-Couplers", now U.S. Pat. No. 5,019,301, which is a continuation of U.S. application Ser. No. 07/297,009, each of which is incorporated herein by reference.

BACKGROUND OF THE INVENTION

This invention relates generally to transmissive fiber optic star-couplers and more particularly to an inexpensive method of manufacturing star-couplers having a biconical mixing element which is physically separate from the fiber optic bundles forming the input and output ports of the mixing element and which is manufactured independently of such bundles.

It is known from prior art, such as U.S. Pat. No. 4,550,974 and the articles and patents cited therein, that a star-coupler having N-input and N-output ports can be manufactured by twisting and fusing together a group of N fibers along a certain length of such fibers. If the fused length, which is an integral part of such a coupler, is formed into a biconical shape, the star-coupler has improved performance in that the insertion loss and the port-to-port loss deviation are minimized.

However, the manufacture of such couplers having a fused biconical section is rather difficult and is beset with low yield problems. This is largely due to the delicate process of forming the taper while fusing N fibers for an N-port coupler. In addition, some cladding material may inadvertently be mixed with the core material in the fused biconical section. Such mixing may cause random light scattering which defeats the objectives of low insertion loss and minimum port-to-port deviation. Moreover, any given fiber in the fused bundle may retain a preferential, or larger, share of the light introduced into it resulting in more light at its respective output port. That is, each of the N fibers in an N-port coupler may be matched to its own input and output ports. In contrast, in an ideally fused section, a fiber cannot distinguish its two ends from those of any of the other fibers in the coupler. Lack of such a characteristic of an ideally fused section is a major source of the nonuniformity of insertion loss across the different ports in conventional fused biconical couplers.

One attempt at overcoming this problem of unmatched ports is to employ the push-pull techniques discussed in U.S. Pat. No. 4,550,974. Such techniques produce a ball-shaped formation in the center of the fused biconical section which essentially makes each of the fibers in the coupler lose the identity of its own two ends from those belonging to the other fibers.

However, the general problems associated with the technology of fused biconical couplers and packaging the delicate fused section continue to result in low yields. For example, a poorly fused section in an integral coupler often produces unacceptable performance. Additionally, one or more fibers in a fused bundle frequently breaks off from the rest of the assembly, resulting in the loss of the entire coupler.

SUMMARY OF THE INVENTION

The present invention relates to improved transmissive fiber optic star-couplers and methods for their manufacture.

The coupler of the present invention is modular in nature and includes a mixing rod that is biconically tapered and is fabricated independently of the fiber bundles forming input and output ports. The principal advantages of such a coupler are ease of manufacture, high manufacturing yield, uniform loss at various output ports and adaptability of the concept to other star-couplers. The manufacturing yield loss is minimized since the mixing rod and the bundles of optical fibers at the input and output ends are physically separate components. More specifically, the yield loss is minimized because each of the components can be fabricated with the desired performance following a modular approach and finally assembled into a coupler with properly optimized individual components. Thus, one of the major advantages of the modular approach to fabricating a biconical mixing rod coupler is lower cost.

The mixing element of the present invention preferably is a biconically tapered fiber having a core diameter at each of its two ends equal to the effective diameter of the fiber optic bundles to which it is attached. Thus, for a 7-port coupler the diameter of the mixing fiber ends equals three times the individual fiber diameters in the bundles, and for a 19-port coupler the ends have a diameter five times that of the individual fiber diameters in the bundles. In a conventional mixing rod coupler, the mixing element is of uniform cross-section with the above diameters for 7 and 19 port couplers respectively.

One version of the mixing rod comprises an optical fiber which is terminated with standard fiber optic connectors and then biconically tapered. The taper can be formed in-situ by applying heat to a center section of the fiber and applying tension to the two ends in a controlled manner, while monitoring the distribution of light from an excited fiber on the input side onto the various output ports until the desired or optimum uniformity is obtained.

The biconical mixing element may be constructed from silica, plastic or other suitable material and can be used interchangeably with fiber bundles of any of these materials. For example, the bundles can be plastic while the mixing rod may be silica or vice versa.

A biconical mixing element is relatively inexpensive and may be employed in practically any star-coupler to provide a minimum port-to-port deviation. For example, a port-to-port deviation of 1.5 to 2.0 dB has been measured for a biconical mixing rod nineteen-port star-coupler compared to 3-5 dB for a conventional mixing rod star-coupler with a uniform diameter mixing rod.

More specifically, in a conventional mixing rod 19-port star-coupler employing optical fibers of 100 micron diameter, the insertion loss typically varies from 17 to 22 dB depending on the port. This corresponds to a port-to-port deviation of 5 dB. In a 19-port star-coupler having a biconical taper, the insertion loss has been measured to be 19.3 to 20.6 dB. This corresponds to a port-to-port deviation of less than 1.5 dB.

BRIEF DESCRIPTION OF THE DRAWINGS

These and other objects, features and advantages of the present invention will become more readily apparent from the following detailed description of the invention in which like elements are labelled similarly and in which.

DETAILED DESCRIPTION OF THE INVENTION

Figure 1:
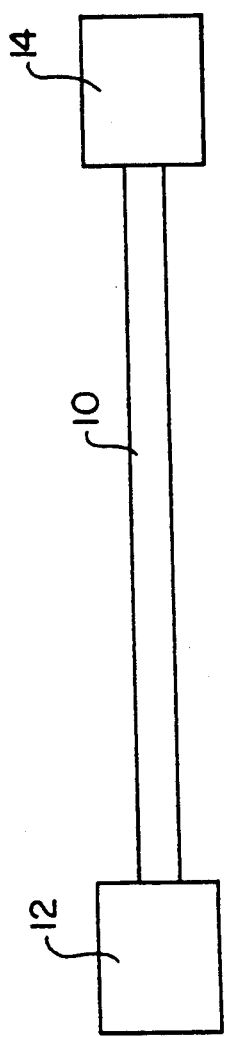
FIG. 1 schematically depicts a mixing rod of uniform diameter terminated with fiber optic connectors.

FIG. 1 schematically depicts a conventional mixing rod or fiber 10 that has been terminated with fiber optic connectors 12, 14 using standard procedures such as potting the fiber in epoxy in the connector, curing and polishing, etc. Preferably, the mixing rod is of uniform diameter.

Figure 2:
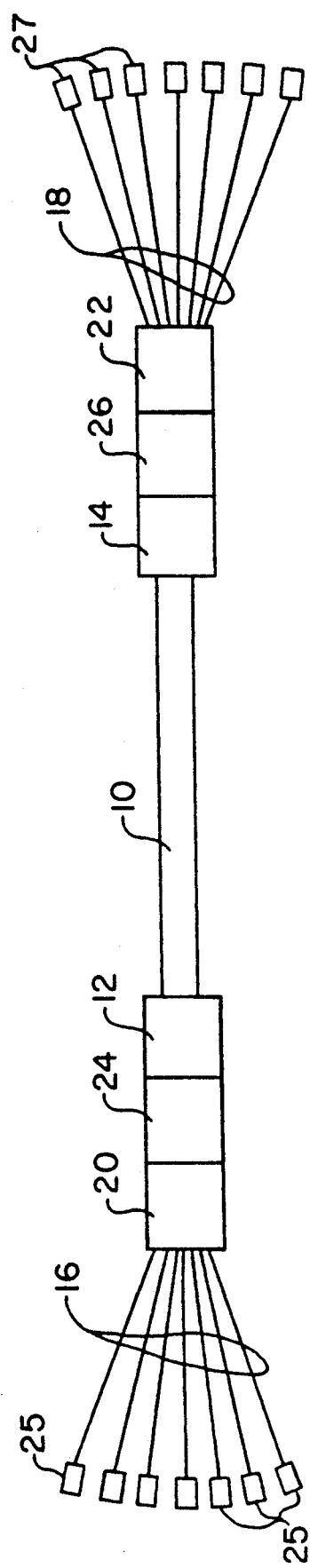
FIG. 2 schematically depicts a mixing rod star-coupler comprising two separate bundles of optical fibers terminated with fiber optic connectors.

FIG. 2 schematically depicts mixing element 10 and fiber optic connectors 12, 14 of FIG. 1 connected to two fiber optic bundles 16, 18. In particular, fiber optic bundles 16, 18 are terminated at their bundled ends with connectors 20, 22, respectively. Connectors 20, 22 are preferably identical to each other and can be mated with suitable fiber optic couplings and adaptors, advantageously resulting in a modular star-coupler. Similarly, the individual fibers of bundles 16, 18 at their non-bundled ends are provided with suitable connectors 25, 27, respectively. Connectors 20, 22 are connected to connectors 12, 14 by way of fiber optic adaptors 24, 26, respectively. The two bundles 16, 18 may be master bundles that have been previously tested and optimized for their attenuation properties and/or the connector loss. One set of such master bundles can be used for forming tapers in a number of mixing rods, which in turn can be used for manufacture of such couplers for eventual use with other bundles prepared by a similar termination procedure.

Figure 3:
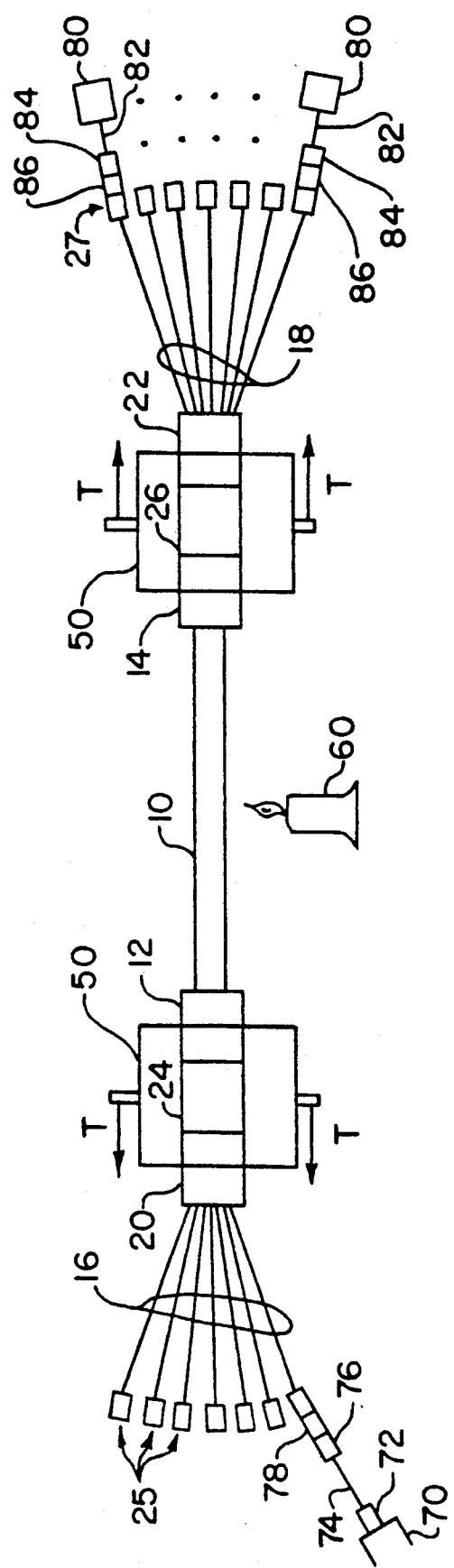
FIG. 3 schematically depicts in-situ taper formation for a mixing rod assembly of the type depicted in FIG. 2.

FIG. 3 schematically depicts a device 50 to apply tension in the direction of arrow T on mixing rod 10, and a heat source 60 to soften mixing rod 10 to elongate and form a taper. The taper is formed while monitoring the distribution of light across the output ports from an excited fiber on the input side.

More specifically, light is input to one of input connectors 25 by way of light source 70, connector 72, optical fiber 74, connector 76 and fiber optic adaptor 78. Such light is detected by light detectors 80 by way of optical fibers 82, connectors 84, adaptors 86 and connectors 27. For the purposes of illustration, bundle 16 is treated as the input side and bundle 18 is treated as the output side. It should be noted that the coupler preferably has symmetrical properties in both directions. In order to ensure that the loss at different ports is nearly uniform, one may excite a number of fibers at the input side one at a time and individually measure the light distribution at each of the optical fibers at the output side. Alternatively, one or more fibers at the output side can be excited to measure the light distribution at the input side.

In view of the fact that the individual fibers in the bundles are not fused together, the packing loss in the mixing rod couplers may be higher than in fused couplers, unless the number of fibers chosen forms a close packed structure. For most practical couplers, such close packed structures are realized for fiber bundles containing 7, 19 or 37 fibers of equal diameter and so on.

Figure 4:
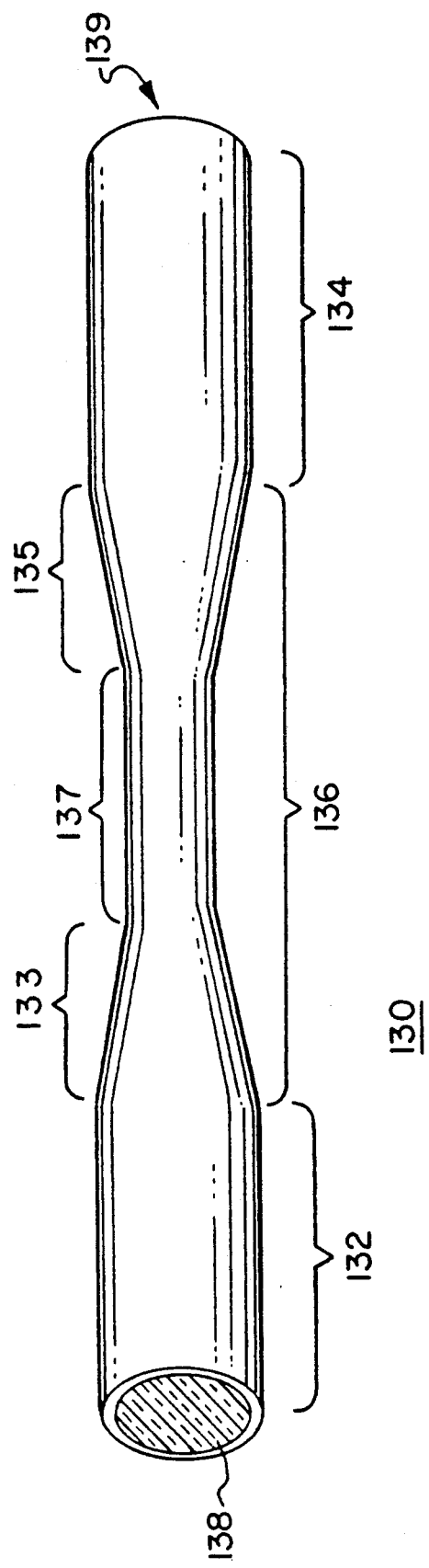
FIG. 4 depicts the tapered mixing rod of the present invention in detail.

FIG. 4 depicts a biconical mixing element 130 suitable for use with the modular coupler of the present invention. Biconical mixing element 130 comprises a first end 132, a second end 134 and a biconical mixing section 136. Biconical mixing section 136 includes tapered regions 133, 135 and central region 137. First end 132, second end 134 and biconical mixing section 136 are each preferably provided with a circular cross section. As is apparent, the diameter of central region 137 is less than the diameter of ends 132, 134. Ends 132, 134 of biconical mixing element 130 are provided with faces 138, 139, respectively, to mate with ends of the fiber optic bundles to which they are attached.

Biconical mixing element 130 is preferably biconical and constructed from a single optical fiber having a core diameter at each of its two ends approximately equal to the diameter of the fiber optic bundle to which it is attached. Illustratively, biconical mixing element 130 may be formed by the taper formation process depicted in FIG. 3. Biconical mixing element 130 may be constructed from plastic, silica or any other suitable material. The length and diameter of central region 137 as well as the configuration of tapered regions 133, 135 are chosen in accordance with desired operating characteristics.

The core of mixing element 130 is surrounded by a cladding material as in conventional optical fibers. The cladding material has a lower index of refraction than the core material. Thus, light is propagated in the core material and guided and confined therein by the cladding material as a result of total internal reflection. A suitable material for the cladding is fluorinated polymethylmethacrylate (PMMA) while a suitable material for the core is pure PMMA.

Biconical mixing element 130 should be sufficiently long that light from any individual optical fiber in one fiber optic bundle is uniformly distributed over all of the N outgoing optical fibers in the other fiber optic bundle. Increasing the length of the mixing element and, in particular, mixing section 136, improves the uniformity of distribution of light from an input optical fiber to all output optical fibers. However, increasing the length of mixing section 136 is accompanied by an increase in loss. Thus, the length of the mixing section should be chosen in accordance with the diameter of the fiber optic bundle and with desired operating characteristics such as the degree of light distribution uniformity required and the amount of loss which may be tolerated. Illustratively, a suitable length for central mixing region 137 has been found to be on the order of one centimeter, with the length of each of tapered regions 133, 135 being on the order of three centimeters and the length of each of ends 132, 134 being on the order of one centimeter. Specifically, these lengths are suitable for a seven-port or nineteen-port star-coupler with optical fibers having a core diameter in the range of 50 to 100 microns and a central mixing region having a diameter in the range of ten to thirty microns.

As will be appreciated, some degree of mixing of optical energy from the various input optical fibers exists throughout the length of biconical mixing element 130 of FIG. 4. However, most of the mixing occurs in mixing section 136. If first end 132 is the input end and second end 134 is the output end of biconical mixing element 130, tapered region 133 will direct and guide optical energy input at face 138 to central region 137. Tapered region 135 passes the mixed optical energy output from central region 137 to second end 134.

While it is apparent that the invention herein disclosed is well calculated to fulfill the objectives stated above, it will be appreciated that numerous modifications and embodiments may be devised by those skilled in the art, and it is intended that the appended claims cover all such modifications and embodiments as fall within the spirit and scope of the present invention. For example, as one skilled in the art will appreciate, it is desirable at times to loop the mixing fiber for better mixing and therefore better uniformity across the different ports.

What is claimed is:

1. A biconical mixing element for use in a fiber optic coupler comprising:
   (a) an input end having a generally circular cross section;
   (b) a first tapered region in communication with said input end and having a generally circular cross section;
   (c) a central region in communication with said first tapered region and having a generally circular cross section;
   (d) a second tapered region in communication with said central region and having a generally circular cross section;
   (e) an output end in communication with said second tapered region and having a generally circular cross section, said input and output ends each having a diameter greater than a diameter of said central region; and
   (f) a cladding layer surrounding at least said first tapered region, said central region, and said second tapered region, said cladding layer having a lower index of refraction than said first, second and central regions, so as to guide and confine light in said regions, wherein optical energy input to said input end is uniformly mixed in said tapered regions and said central region and uniformly output from said output end so as to minimize port-to-port deviation.

2. The biconical mixing element of claim 1 wherein each of said input and output ends is firmly attached to a connector.

3. The biconical mixing element of claim 2 wherein each of said connectors is removably connected to a fiber optic adaptor which in turn is removably connected to an additional connector which in turn is firmly connected to a fiber optic bundle.

4. The biconical mixing element of claim 3 wherein said mixing element, said connectors, said fiber optic adaptors and said additional connector are modular in design and are interchangeable with corresponding components of other fiber optic couplers, wherein such modularity enables the production of inexpensive and high yield star-couplers.

5. The biconical mixing element of claim 1 wherein said input and output ends, said first and second tapered regions and said central region are injection molded.

6. An improved method for constructing a mixing element for use in a fiber optic star-coupler of the type having a mixing element and assemblies at each end of the mixing element for attaching fiber optic bundles, the improvement comprising forming a biconical mixing element by the steps of:
   (a) supplying light to an optical fiber of said fiber optic bundle at one side of a mixing element of uniform diameter while individually monitoring the light output at a plurality of the optical fibers of said fiber optic bundle at the other side of said mixing element;
   (b) heating a section of said mixing element of uniform diameter; and
   (c) elongating said heated section of said mixing element by the application of tension thereby forming a biconical mixing element having:
      (i) an input end having a generally circular cross section;
      (ii) a first tapered region in communication with said input end and having a generally circular cross section;
      (iii) a central region in communication with said first tapered region and having a generally circular cross section;
      (iv) a second tapered region in communication with said central region and having a generally circular cross section; and
      (v) an output end in communication with said second tapered region and having a generally circular cross section, said input and output ends each having a diameter greater than a diameter of said central region;

wherein optical energy input to said input end is uniformly mixed in said tapered regions and said central region and uniformly output from said output end so as to minimize port-to-port deviation, said optical energy being confined within said regions by a cladding layer surrounding at least said first tapered region, said central region, and said second tapered region, said cladding layer having a lower index of refraction than said first, second and central regions, so as to guide and confine light in said regions.

7. The improved method of claim 6 wherein said step of supplying light and monitoring light output enables controlled elongation of said heated section so as to minimize port-to-port deviation.

* * * * *